United States Patent [19]
Oakes

[11] 3,914,865
[45] Oct. 28, 1975

[54] HAND CARRIED DEVICE FOR DESTROYING HYPODERMIC SYRINGES AND NEEDLES

[75] Inventor: Andrew A. Oakes, Harrington Park, N.J.

[73] Assignee: Becton, Dickinson and Company, East Rutherford, N.J.

[22] Filed: July 19, 1974

[21] Appl. No.: 490,091

[52] U.S. Cl. .................................. 30/131; 83/167
[51] Int. Cl.² .................. B23D 21/06; B26B 13/22
[58] Field of Search ........ 83/580, 167, 199; 30/112, 30/131, 134; 241/99

[56] References Cited
UNITED STATES PATENTS

| | | | |
|---|---|---|---|
| 594,072 | 11/1897 | Forde | 30/134 |
| 3,404,593 | 10/1968 | Arcarese | 83/167 |
| 3,683,733 | 8/1972 | Johan | 83/580 |
| 3,736,824 | 6/1973 | Dunnican | 83/167 |
| 3,785,233 | 1/1974 | Robinson | 83/580 |
| 3,802,074 | 4/1974 | Hoppe | 30/134 |

Primary Examiner—Al Lawrence Smith
Assistant Examiner—J. C. Peters
Attorney, Agent, or Firm—Kane, Dalsimer, Kane, Sullivan and Kurucz

[57] ABSTRACT

A hand carried, hand operated portable device for destroying hypodermic cannulas and syringe barrels, Luer and slip tips of plastic syringe barrels is disclosed. The device comprises a portable housing enclosing a needle chamber for the safe storage of sheared cannula pieces. Mounted on the housing is a means for shearing cannulas, (20 to 30 guage) whereupon the sheared cannula falls into the storage compartment. Once a sheared cannula has entered the storage compartment, it cannot be conveniently removed unless the device is destroyed. Optionally mounted on the housing is a means for shearing the plastic barrel, Luer and slip tip of a hypodermic syringe, to prevent its misuse after its intended use. The device of the invention is highly portable, hand operated and disposable following a plurality of uses.

13 Claims, 9 Drawing Figures

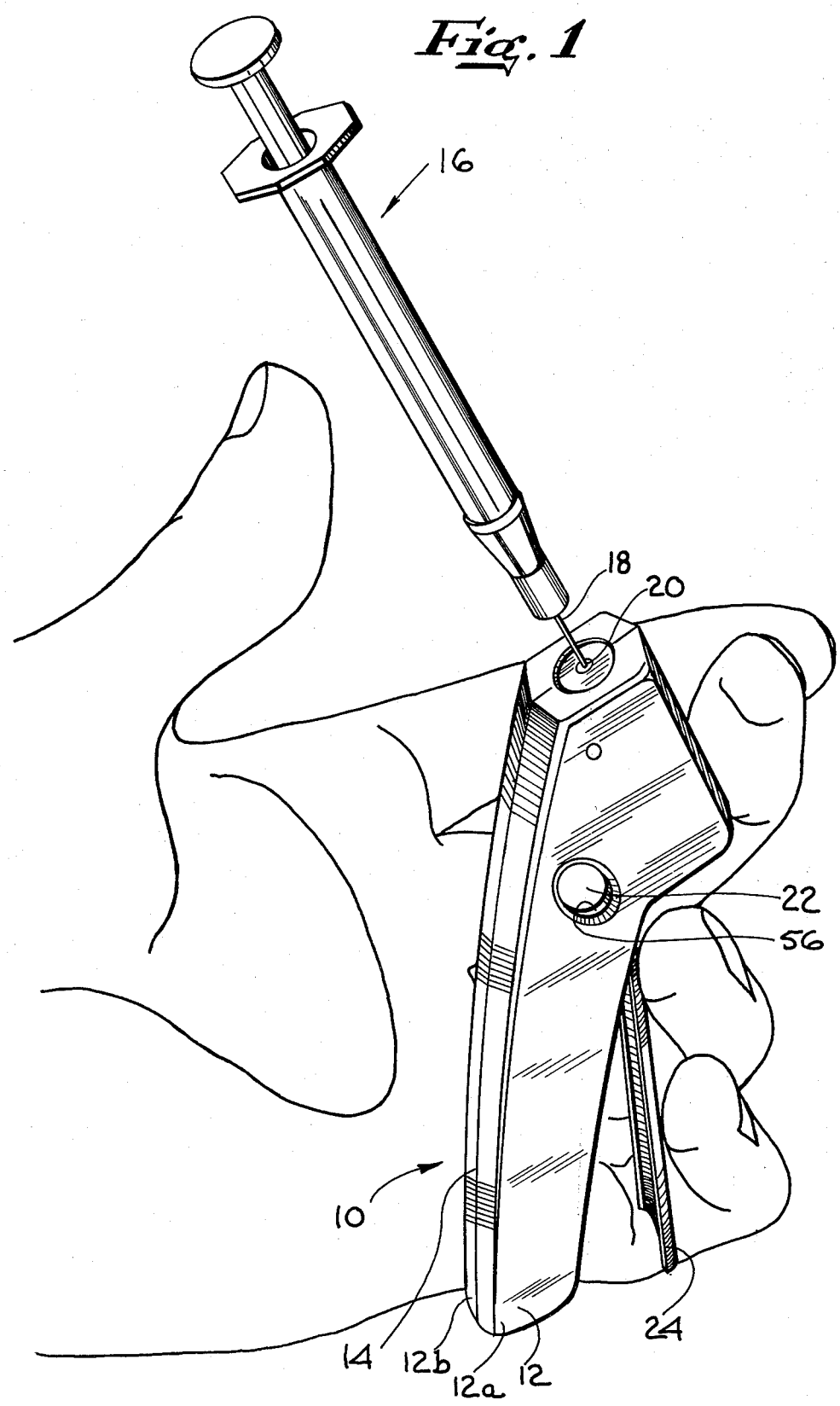

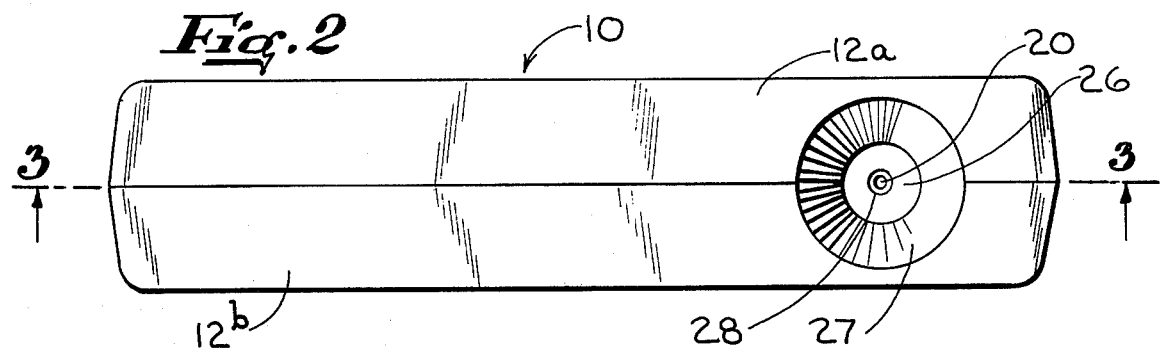
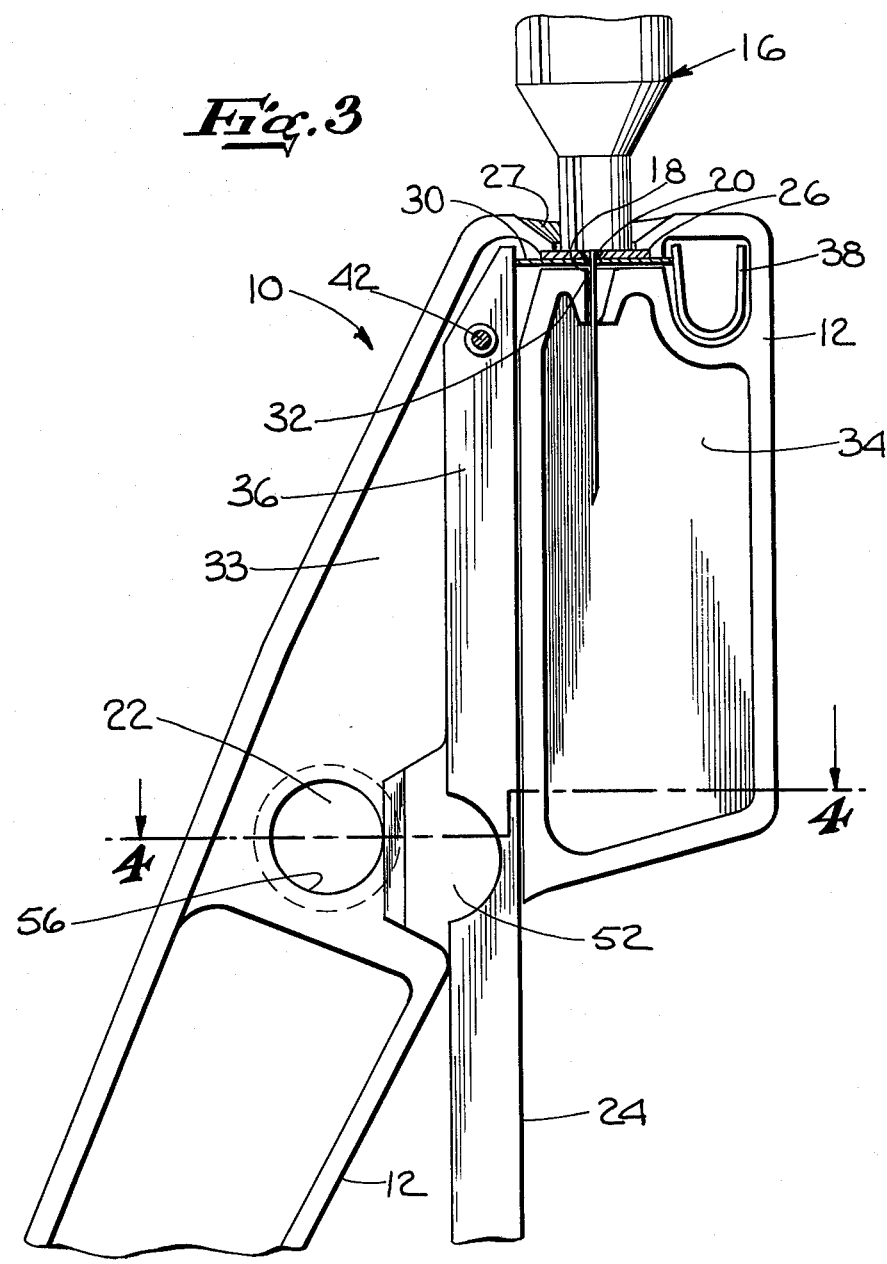

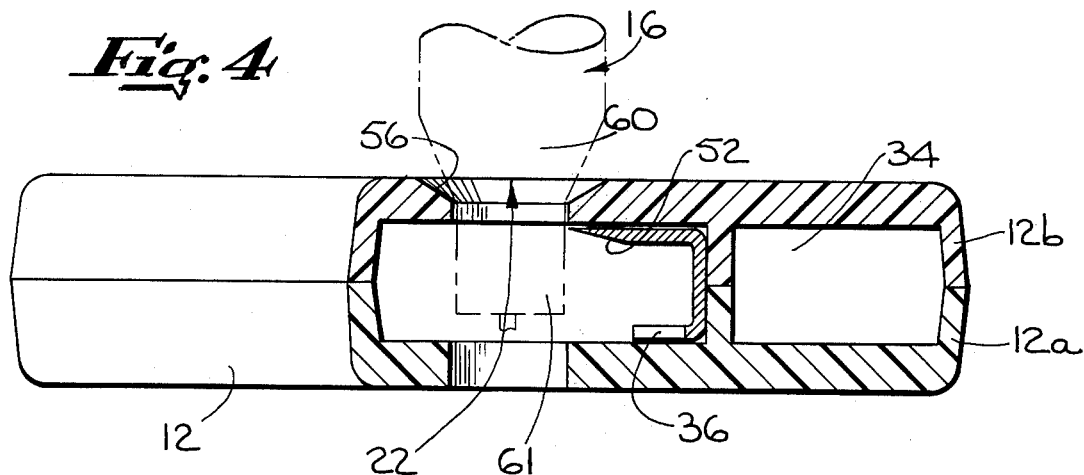
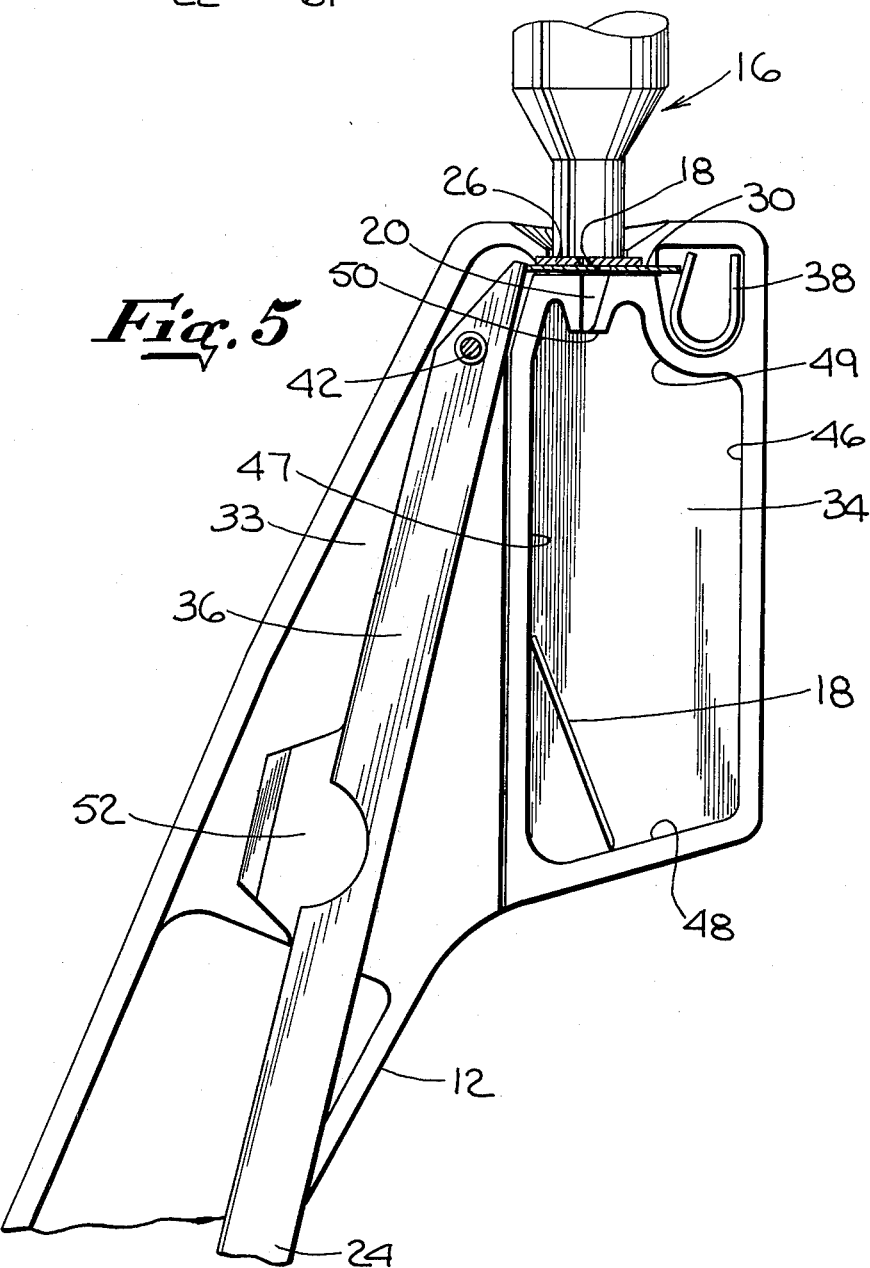

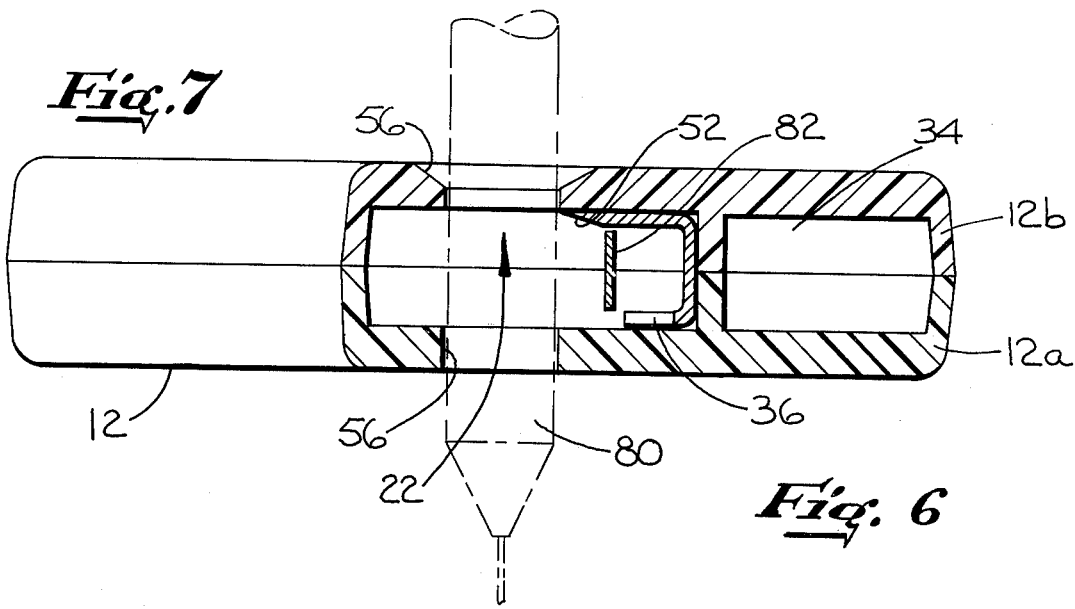
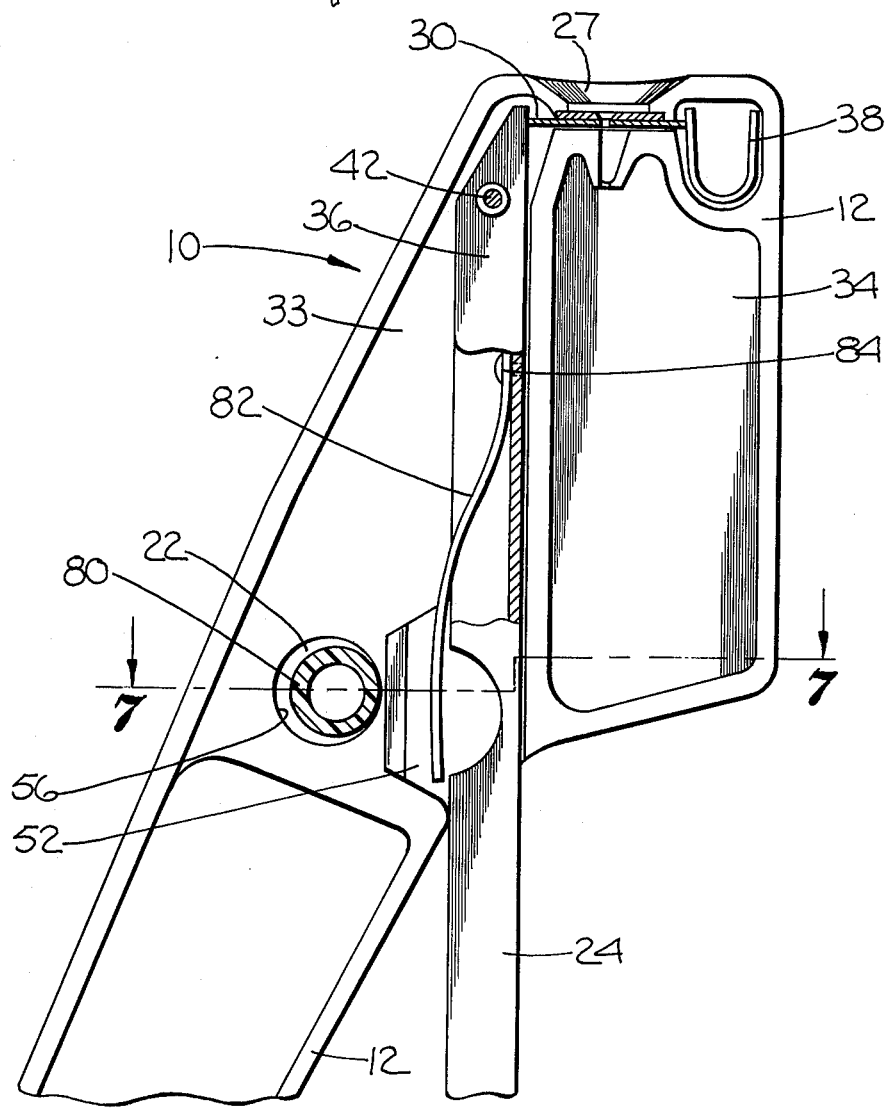

HAND CARRIED DEVICE FOR DESTROYING HYPODERMIC SYRINGES AND NEEDLES

BACKGROUND OF THE INVENTION

1. Field of the Invention

The invention concerns apparatus for destroying hypodermic cannulas (20 to 30 guage) and plastic barrels, Luer and slip tips of plastic syringes and more particularly concerns a manually portable, hand operated and disposable device for destroying plastic hypodermic syringes.

2. Brief Description of the Prior Art

Prior hereto devices which were suitable for destroying both hypodermic cannulas and hypodermic syringe barrels comprises massive, bulky and complex devices which were not readily portable or feasible to dispose of after use.

Representative of the prior art devices are those described in U.S. Pat. Nos. 3,404,593; 3,444,620 and 3,469,750. More recently, portable devices such as that described in U.S. Pat. Nos. 3,585,835 and 3,736,824 have been known. U.S. Pat. No. 3,736,824 describes a pocket sized and hand operated needle destruction device. Although this device is highly convenient and readily carried by hand, it lacks a means for destroying the syringe barrel and Luer or slip tip. The drug availability problems encountered today not only include the illegal and hazardous uses of hypodermic syringe needles but include the unauthorized and illegal use of disposable syringe barrels which may be employed by the innovative drug user, without a cannula component.

The apparatus of my invention provides a means for the legitimate syringe user to carry on his person a relatively simple and inexpensive device which will provide a means for destroying completely both plastic barrel or Luer or slip tip of the syringe and cannula of a hypodermic syringe assembly. The needle component is removed as a hazardous object by its retention within a storage compartment of the device of the invention.

The apparatus of my invention is economical to produce and may be readily disposed of in a safe manner when the shearing blades are no longer effective because of extensive use or when the storage compartment for broken needles has become full.

BRIEF SUMMARY OF THE INVENTION

The invention comprises a hand carried, hand operated portable device for destroying hypodermic cannulas and plastic syringe barrels, Luer and slip tips which comprises:
 a hand carriable housing;
 a storage chamber enclosed by said housing and having an entry port, said entry port being adapted to receive a hypodermic cannula and being communicative with the exterior of said housing;
 manually operated means mounted on said housing for shearing cannulas inserted into said entry port;
 an aperture through said housing adapted to receive the barrels, Luer or slip tip of a plastic hypodermic syringe; and
 manually operated means mounted on said housing for shearing plastic hypodermic syringe barrel Luers or slip tips which have been inserted into said aperture.

BRIEF DESCRIPTION OF THE DRAWINGS

FIG. 1 is an overall view of an apparatus of the invention with a syringe needle inserted therein for shearing.

FIG. 2 is a front elevation of the apparatus of the invention shown in FIG. 1.

FIG. 3 is a partial cross-sectional side elevation view of the apparatus of the invention as shown in FIG. 1.

FIG. 4 is a cross-sectional view along lines 4—4 of FIG. 3 and shows the position of a Luer tip prior to severance.

FIG. 5 is a cross-sectional side elevational view of the apparatus of the invention as shown in FIG. 3, but following the shearing of the hypodermic syringe cannula.

FIG. 6 is a view of a preferred embodiment of the invention as seen in a cross-section if taken along lines 3—3 of FIG. 2 and additionally shows a syringe barrel positioned to be severed and a means of retaining the barrel after severance.

FIG. 7 is a view along lines 7—7 of FIG. 6.

DETAILED DESCRIPTION OF THE INVENTION

Figure 9:
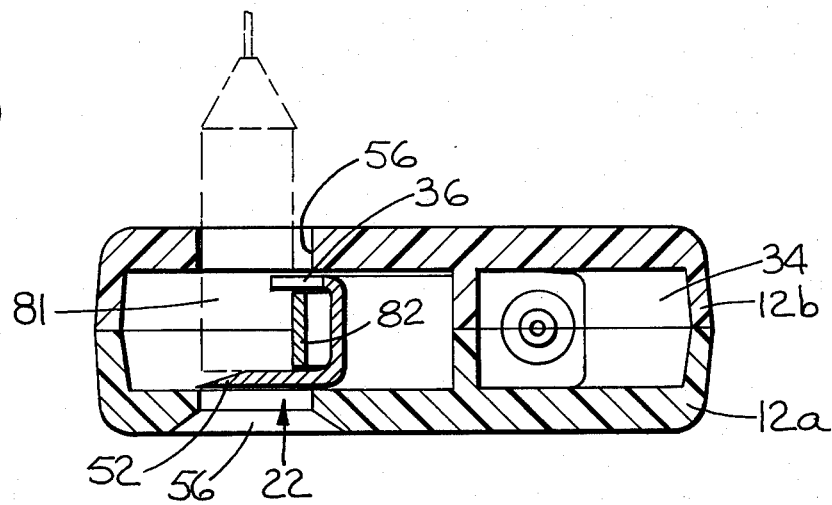
FIG. 9 is a view along lines 9—9 of FIG. 8.

The apparatus of the invention is conveniently described by referring to the embodiments shown in the drawings accompanying this specification.

Referring to FIG. 1, there is seen a hand held apparatus 10 of the invention which comprises housing 12. Housing 12 may be molded of any convenient and conventional material. In the interest of economy and encouraging frequent disposability, the housing may be fabricated of polymeric plastics such as polybutylene, polystyrene, polypropylene polyacrylates, polyurethanes, polycarbonates, mixtures thereof and like materials. The housing 12 is conveniently molded of such polymer materials in two parts 12a and 12b which are joined at the midline 14 by conventional means such as by ultrasonic welding, solvent sealing, adhesives, thermal bonding and like methods. FIG. 1 shows a hypodermic syringe needle 18 being inserted into the interior of housing 12 through an entry portal 20 prior to shearing of needle 18 and also shows a barrel, Luer or slip tip receiving aperture 22 which passes through housing 12. Appurtenant to housing 12 is lever handle 24 which will be described more fully hereinafter.

FIG. 2 is an overall view of the apparatus 10 as seen from the forward end, viewing the entry portal 20. Defining entry portal 20 is front shearing plate 26 through which portal 20 passes. Front shear plate 26 is located below recess 27 of housing 12. The portal entry 20 has a diameter sufficient to accept needles of between about 20 and 30 guage and front shear plate 26 which is preferably fabricated of tempered steel has a countersunk area 28 around the periphery of portal 20 to assist in directing entry of syringe cannulas.

To operate the apparatus 10 of the invention, one inserts the syringe cannula 18 into portal 20 as seen most clearly in FIG. 3, a partial cross-sectional side elevation of apparatus 10. Cannula 18 traverses through front shear plate 26 and rear shear plate 30 which has an opening 32 in axial alignment (normal position) with the opening through front shear plate 26. The openings through front 26 and rear 30 shear plates (when rear plate 30 is in its normal position) form the portal entry 20 into enclosed compartment 34 of housing 12. Front plate 26 is in fixed position mounted in housing 12 but rear shear plate 30 is movable transversely to the axis of portal 20. In its normal position as illustrated in FIG. 3, rear shear plate 30 is held in position against lever 36 by the tension exerted upon plate 30 by spring 38. In operation, handle portion 24 of lever 36 protruding from housing 12 is manually moved by the operator squeezing handle 24 toward housing 12. This movement causes lever 36 to pivot around pin 42, by which lever 36 is attached to the interior 33 of housing 12. Pivoting lever 36 moves rear shear plate 30 against spring 38. In this manner, the cooperation of fixed front shear plate 26 and moving rear shear plate 30 shears cannula 18. The sheared cannula 18 drops into compartment 34 as seen best in FIG. 5, which illustrates apparatus 10 with lever 36 moved to actuate the shearing action between shear plates 30 and 26. Upon release of handle 24, spring 38 moves rear shear plate 36 to its normal position which also returns lever 36, and thereby handle 24 to the normal position previously described, and as seen in FIG. 3. FIG. 5 also shows best the nature of compartment 34 within housing 12. The compartment 34 is completely enclosed by interior walls 46, 47, 48 and 49 of housing 12. The only entry is through portal 20 which enters compartment 34 on a projection 50. This entry design prevents sheared cannula 18 from being readily withdrawn or likely to accidentally be removed from containment in compartment 34. Compartment 34 has a preferred distance between projection 50 and wall 48 of about 1 ½ inches so that needles of that length are easily accepted Needles of greater length may be sheared and contained within compartment 34 by shearing them a plurality of times. As mentioned previously, the apparatus 10 may be safely disposed of when compartment 34 is filled with sheared cannulas.

Referring again to FIG. 3, it is seen that lever 36 has mounted thereon a shear blade 52 of low carbon steel, adjacent to aperture 22 through housing 12, when lever 36 is in its normal position as illustrated. As shown in FIG. 5, when handle 24 of lever 36 is moved toward housing 12 it causes shear blade 52 to traverse the aperture 22 which lies in its path. Obviously, if a shearable object were inserted in aperture 22 when handle 24 was squeezed toward housing 12, that object would be held against interior surface 56 of aperture 22 and sheared by shearing blade 52. In this manner, it is possible to employ shear blade 52 and aperture 22 to hold and shear the barrel, Luer tip or slip tip of a plastic barrel of the syringe 16. This is illustrated in FIG. 4, a cross-sectional view along lines 4—4 of FIG. 3 showing Luer tip 61 of plastic barrel 60 of syringe 16 inserted through aperture 22 of housing 12. Upon manual activation, as previously described, shear blade 52 moves down to hold tip 61 against interior surface 56 and to shear the tip 61. The sheared syringe 16 can then be disposed of without fear of its being reused for any illegal purpose. The aperture 22 is of sufficient size to receive a standard 1cc syringe barrel or a maximum barrel diameter of 0.370 inches and the Luer and slip tips of most other standard plastic syringes. In the case of syringe barrel having a maximum diameter of 0.370, the barrel is cut in half. On larger diameter barrels only the Luer or slip tip is cut off.

Referring to FIG. 6, there is seen a cross-sectional view of a preferred embodiment of the invention, substantially identical to that of FIG. 3 but additionally showing a plastic syringe barrel 80 positioned in aperture 22 and awaiting severance by shear blade 52. FIG. 6 also shows in this embodiment a retainer spring 82 beneath the sharpened edge of shear blade 52 and anchored at one end to lever 36 by bolt 84. Spring 82 is carried by lever 36 and serves to hold the severed barrel of syringe 80 as will be described hereinafter.

Figure 8:
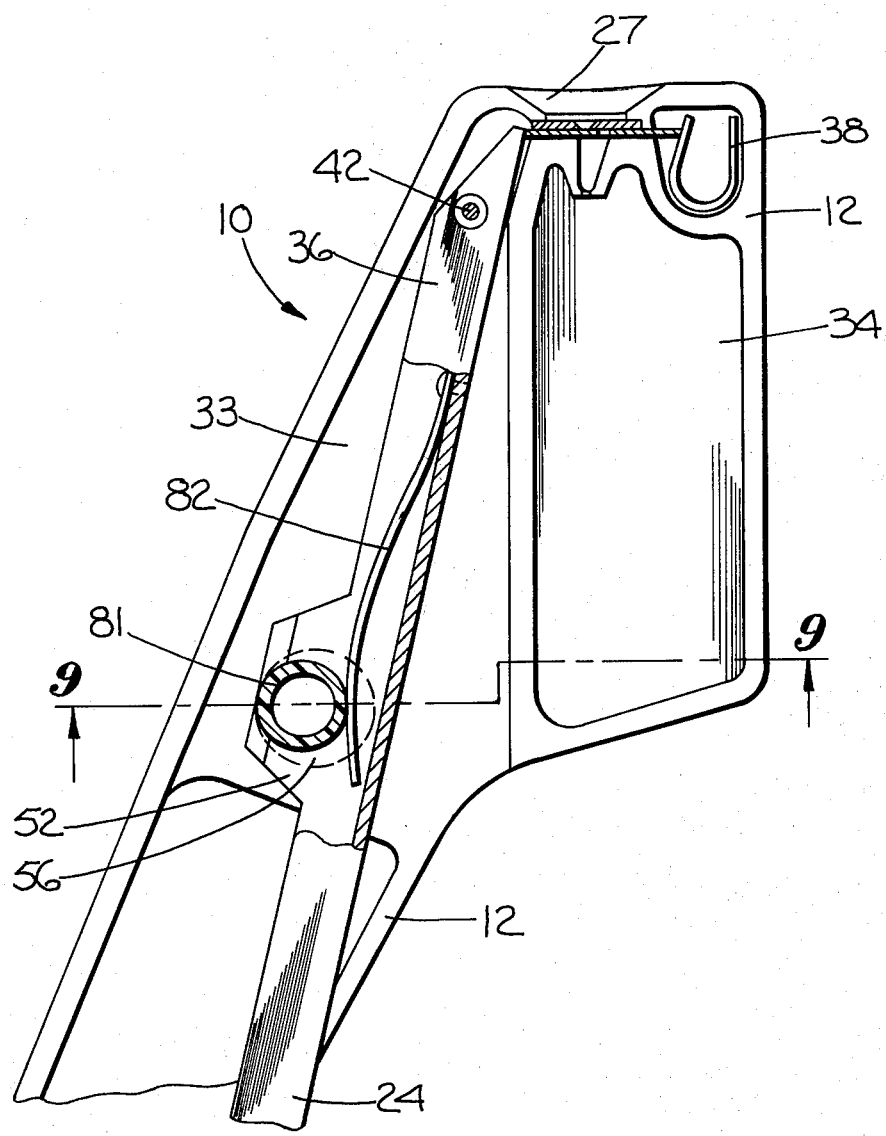
FIG. 8 is a view as in FIG. 6 but after severance of the syringe barrel.

FIG. 7 is a view along lines 7—7 of FIG. 6 and shows in more detail the positioned relationship of syringe barrel 80, retainer spring 82 and shear blade 52 prior to severance of the barrel 80. Syringe barrel 80 is severed after insertion in aperture 22 by squeezing lever 36 toward housing body 12 as described previously for severing a cannula. The shear blade 52 is forced by the pressure or lever 36 to shear the plastic barrel 80 and retainer spring 82 is pressed against the loose severed end 81 of syringe barrel 80 (the other end having been held by the operator). This is clearly seen in FIG. 8, a cross-sectional view as seen in FIG. 6 but following movement of lever 36 to sever barrel 80. The pressure of retaining spring 82 holds the severed portion 81 of barrel 80 against the interior surface 56 of aperture 22 so loose severed end 81 of barrel 80 does not drop. Details of this function of retainer spring 82 are clearly seen in FIG. 9, a view along lines 9—9 of FIG. 8. Following severance of the plastic barrel 80, the operator may dispose of the hand held portion of the severed barrel, grasp the portion 81 held by retainer spring 82, release lever 36 and remove the severed portion 81 of barrel 80 for disposal. The means of shearing syringe barrels is a preferred embodiment of the invention. In the same manner, the slip tip of a slip tip type of plastic syringe may be inserted in aperture 22 and sheared from the syringe barrel.

Although the above described embodiments represent preferred forms of the invention, they are not to be considered as defining the limits of the invention. For example, although the illustrated embodiment utilizes a portion of the housing as a means of grasping the device, one may attach a separate grip means, such as a handle, to the housing which then defines the enclosed needle part chamber only.

I claim:

1. A hand carried, hand operated portable device for destroying hypodermic cannulas and plastic syringe barrels, Luer and slip tip or syringes which comprises:
   a. a hand carriable housing;
   b. a storage chamber completely enclosed by said housing and having only a single entry port, said entry port being adapted to receive a hypodermic cannula into said storage chamber only and being communicative with the exterior of said housing;
   c. manually operated means mounted on said housing for shearing cannulas inserted into said entry port said means being operable while said housing is carried in a hand;
   d. an aperture through said housing adapted to receive the barrel of a plastic hypodermic syringe and Luer or slip tip, and
   e. manually operated means mounted on said housing for shearing plastic hypodermic syringe barrel Luers or slip tips, which have been inserted into said aperture said means being operable while said housing is carried in a hand.

2. A device according to claim 1 wherein said means for shearing cannulas comprises a lever mounted on said housing; a fixed shear plate mounted on said housing; and a movable shear plate in association with said fixed shear plate; said movable shear plate being moved by levering said lever.

3. A device according to claim 2 wherein said lever is movable against a tension spring.

4. A device according to claim 1 wherein said means for shearing plastic barrels, Luer and slip tips of syringes comprises a lever mounted on said housing and a shearing blade attached to said lever.

5. A device according to claim 4 wherein said housing acts as a support for the barrel to be sheared.

6. A device according to claim 1 wherein said means for shearing barrels comprise a single lever in association with shear means and mounted on said housing.

7. A device according to claim 6 wherein said shear means comprises a shear blade attached to said lever for shearing barrels and a fixed shear plate mounted on the housing in association with a movable shear plate mounted on said housing and which is movable by said lever.

8. A device according to claim 1 wherein said entry port into said storage chamber is defined by a projection of the housing into said chamber.

9. A device according to claim 1 having additionally a means for retaining the severed portion of a plastic syringe barrel.

10. A device according to claim 9 wherein said means for retaining said severed portion of a plastic syringe barrel comprises a retention spring in association with said manually operated means for shearing said syringe barrels.

11. A hand carried, hand operated portable device for destroying hypodermic cannulas which comprises:
a housing;
a storage chamber completely enclosed by said housing and having a single entry port through said housing into said chamber, said entry port being adapted to receive a hypodermic cannula into said chamber only;
grip means laterally disposed to said housing for holding said device;
a shearing surface held in a first position adjacent to said entry port by spring means and movable across said entry port by shear actuating means;
shear actuating means cooperating with said grip;
an aperture through said housing adapted to receive the barrel of a plastic hypodermic syringe and Luer or slip tip, and
a manually operated means mounted on said housing for shearing plastic hypodermic syringe barrels, Luers or slip tips which may have been inserted into said aperture.

12. A device according to claim 11 wherein said grip means is a handle attached to said housing.

13. A device according to claim 11 wherein said shear actuating means is a lever pivotally mounted in association with said grip means.

* * * * *